United States Patent [19]

Rocha

[11] Patent Number: 4,513,342
[45] Date of Patent: Apr. 23, 1985

[54] CURRENT-SQUARED-TIME ($I^2T$) PROTECTION SYSTEM

[75] Inventor: Henry A. F. Rocha, Schenectady, N.Y.

[73] Assignee: General Electric Company, Schenectady, N.Y.

[21] Appl. No.: 462,271

[22] Filed: Jan. 31, 1983

[51] Int. Cl.³ .............................................. H02H 3/093
[52] U.S. Cl. ........................................ 361/94; 361/96; 361/31
[58] Field of Search .................. 361/94, 95, 96, 97, 361/31, 24, 93; 324/117 R, 109; 73/DIG. 4

[56] References Cited

U.S. PATENT DOCUMENTS

| | | | |
|---|---|---|---|
| 3,846,675 | 11/1974 | Shimp | 361/95 |
| 3,944,890 | 3/1976 | Little | 361/96 |
| 3,968,410 | 7/1976 | Graham | 361/96 |
| 3,997,839 | 12/1976 | Dreyfus et al. | 324/109 |
| 4,012,669 | 3/1977 | Gelfand et al. | 361/97 |
| 4,345,288 | 8/1982 | Kampf et al. | 361/31 |

*Primary Examiner*—Patrick R. Salce
*Attorney, Agent, or Firm*—Geoffrey H. Krauss; Marvin Snyder; James C. Davis, Jr.

[57] ABSTRACT

A system for protecting an electrical component, drawing current from a power source, utilizes a sensor providing an output signal proportional to the square of the load component current. The squared-current signal, when greater than a squared-normal-current signal, is integrated and compared to a current squared-time value. A system output is enabled if the load component instantaneous $i^2t$ value is greater than the current squared-time value set at the comparator, to remove the current flow to the protected component.

10 Claims, 2 Drawing Figures

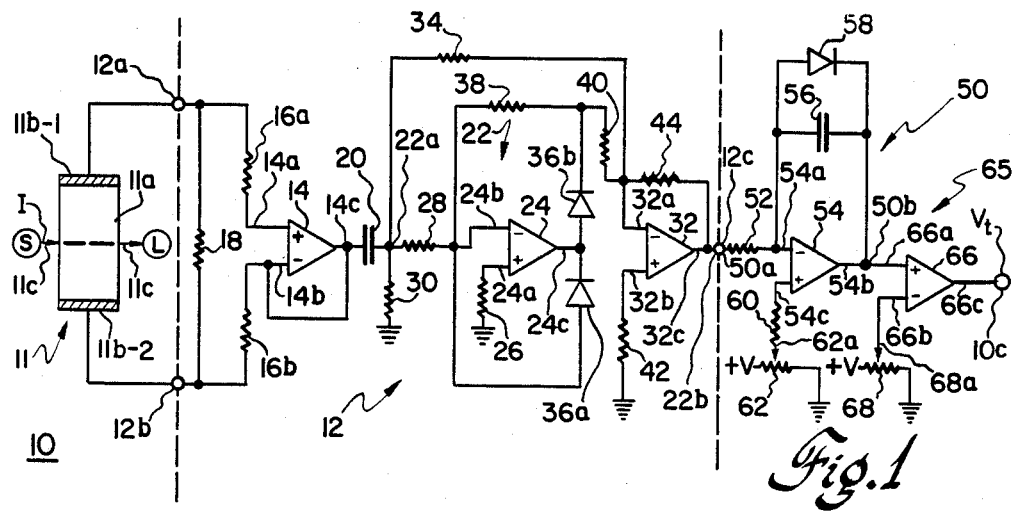
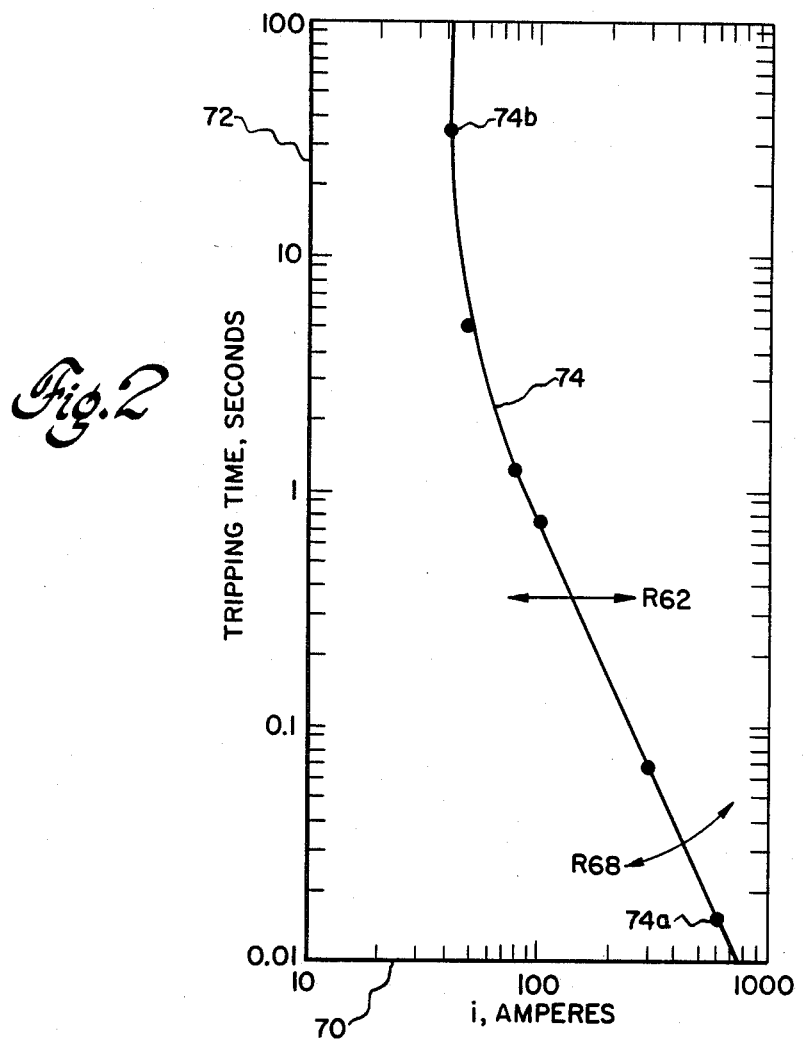

CURRENT-SQUARED-TIME (I²T) PROTECTION SYSTEM

BACKGROUND OF THE INVENTION

The present application relates to current-time protection systems and, more particularly, to a novel i²t protection system capable of protecting active and passive electronic components against overloads.

All electronic and electric components, whether of active nature, e.g. a motor, or passive nature, e.g. wiring, switches and the like, have some finite dissipative quality which causes a temperature rise to occur within that component during use. Each component has a maximum rated temperature which is not to be exceeded during operation thereof. However, various operating conditions, e.g. due to inrush currents at the start of operation and the like, often cause a limited overload to occur. Such limited overload operation is allowable, as long as the maximum rated temperature of the component is not exceeded.

Assuming, for simplicity of explanation, a basically resistive component, the operating temperature thereof is determined by the equilibrium of the rate of cooling ($W_c$), itself determined by the characteristics of the component determining the amount of heat energy transferred from that component to the ambient atmosphere and the rate of heating ($W_h$) of the component due to the i²r dissipative losses in the component. Assuming, again for the sake of simplicity, constant resistance r operation of the component in question, the rate of heating $W_h$ is given by $$W_h = (K/t) \int_0^t i^2 dt,$$

where K is a constant and i is the instantaneous current flowing through the component. For a component drawing a normal, or rated, instantaneous current $i_N$, the normal rate of heating $$W_{h-N} = (K/t) \int_0^t i_N^2 dt.$$

For an overload current $i_{OL}$ flowing through the component, the overload heating rate $$W_{h-OL} = (K/t) \int_0^t i_{OL}^2 dt,$$

and a corresponding temperature rise results. On a transient basis, the temperature rise $\Delta T$ during the presence of an overload current $i_{OL}$ is generally proportional to the additional dissipative energy and $$\Delta T = k' \int_0^t (i_{OL}^2 - i_N^2) dt.$$

If a maximum temperature rise $\Delta T_M$ is specified for a component, then the time $t_o$ (during which the overload current $i_{OL}$ flows) before the component is shut down to prevent damage, must be chosen as a function of the overload current itself.

The foregoing is commonly referred to as i²t protection and is approximated within narrow ranges by a variety of devices such as fuses, thermal switches, electromagnetic switches and the like. However, even when a combination of these narrow-range devices are used, the resulting operation is often very different from an ideal i²t relationship. Because each different protected component has a different required protective curve, it is often required to have a different protective combination associated with each component; for example, to protect a motor, a special "heater" unit is often used in the motor starter unit, with a different configuration, size and rating for the special "heater" unit utilized with each size and type of motor. It is clearly desirable to provide an i²t protection system which not only provides an accurate representation of the i²t function over an extended range, typically from a single cycle of the power line frequency (about 16 milliseconds for the 60 Hz. line frequency in use in the United States) to a time of at least 1 minute. It is also desirable to have a single i²t protection system capable of properly protecting a wide range of components by means of varying the setting of simple adjustments provided therein.

BRIEF SUMMARY OF THE INVENTION

In accordance with the invention, an i²t protection system for use with an electrical component drawing a current from a power source, utilizes a sensor providing an output varying as the square of the current drawn; such a sensor is more fully described and claimed in my copending application Ser. No. 432,207, filed Oct. 1, 1982, assigned to the assignee of the present invention, and incorporated herein in its entirety by reference. A signal conditioning means operates upon the sensor output to provide a signal voltage proportional to the square of the current drawn by the component to be protected. The signal conditioning means output voltage is integrated, with respect to time, in a self-resetting integrating means, to provide a signal which is proportional to i²t for each protected component current excursion above the normal operating current thereof. A comparator means compares the integrator means output signal against a signal proportional to a maximum i²t value to provide a trip signal output, for use in removing the protected component from service if the maximum i²t value is exceeded.

In a presently preferred embodiment, the signal conditioning means includes impedance transformation means and precision rectifying means to provide the conditioned signal voltage to the integrator input. Separate adjustments are provided to set the normal steady-state current magnitude, at the integrator means, for controlling the self-resetting function thereof, and for setting the maximum i²t value at the comparator means, whereby the i²t protection circuit of my present invention can be utilized with a wide range of different protected components.

Accordingly, it is an object of the present invention to provide a novel i²t protection circuit for use in the protection of electrical and electronic current-consuming components.

This and other objects of the present invention will become apparent upon consideration of the following detailed description, when read in conjunction with the drawings.

BRIEF DESCRIPTION OF THE DRAWINGS

FIG. 1 is a schematic diagram of a presently preferred embodiment of my novel $i^2t$ protection system; and FIG. 2 is a graph illustrating the $i^2t$ operation of the system of FIG. 1 and the relationship of the tripping time to the magnitude of component current.

DETAILED DESCRIPTION OF THE INVENTION

Referring now to the drawings, my novel $i^2t$ protection system 10 utilizes a current sensor 11 placed between a power source S and a current-utilizing load component L. A sensing element 11a, such as a piezoelectric transducer and the like, having end electrodes 11b-1 and 11b-2 on opposite ends thereof, provides a signal responsive to the square of the current i flowing through at least one adjacent conductor 11c, in the direction of the arrows, from the source to the load component. Advantageously, sensor 11 is of the piezoelectric type described and claimed in the aforementioned application Ser. No. 432,207, although other square-law current sensors can be equally as well utilized. The sensor output signal appears across input terminals 12a and 12b of a signal conditioning means 12. Signal conditioning means 12 serves to provide a DC signal at an output 12c thereof, of magnitude proportional to the square of the component instantaneous current i.

When utilizing the piezoelectric form of square-law current sensor 11, an impedance transformation is required. This impedance transformation can be performed by a source-follower or by a high-input-impedance operational amplifier connected as a voltage-follower. Signal conditioning means 12 utilizes a first operational amplifier 14 to perform this impedance transformation. An inverting + input 14a of the first operational amplifier is connected through a first current-limiting resistance 16a to first signal conditioning means input terminal 12a, while an inverting—input 14b is connected through a second current-limiting resistance 16b to the second signal conditioning means input 12b. Resistances 16a and 16b serve to protect the amplifier from burn-out, if the current I overload is very large. The inverting input 14b is connected to the operational amplifier output 14c to realize the voltage-follower function. As many of the components to be protected by system 10 utilize AC power, the component current i is an AC current and the sensor signal, between terminals 12a and 12b, is an AC signal. Because the illustrated square-law current sensor is a capacitive device, a damping resistance 18 is required across the sensor, from signal conditioning means first input terminal 12a to second input terminal 12b, to provide a discharge path for the sensor capacitance; the magnitude of resistance 18 is selected to allow the sensor output to follow the varying amplitude of the protected component sensed-current signal. A capacitive element 20 is utilized to couple the impedance-transformed signal from the output 14c of first operational amplifier 14 to the input 22a of a full-wave precision rectifier means 22.

For short transients, the output of current sensor 11 is a voltage $$V = c \int_0^t (i^2)dt,$$

where c is a constant dependent upon t particular sensor 11 utilized. For a sinusoidal current, $V = cI^2(\sin^2\omega t)$, where I is the peak current and $\omega$ is the angular frequency of the AC source ($\omega = 2\pi f$, where f is the source frequency, e.g. 60 Hz.). Therefore, $V = I^2(c/2)(1 - \cos 2\omega t)$. By coupling through capacitance 20, the DC component is removed and the voltage V' at input 22a is $V' = I^2(c'/2)(\cos 2\omega t)$, where c' is another constant. The voltage at input 22a is of the same form, for steady-state AC operation, wherein the DC component vanishes from the buffered sensor output. The full-wave precision rectifier means 22 is utilized to recover a DC component at the signal conditioning means output 12c.

Rectifier means 22 utilizes a second operational amplifier 24 having a first, non-inverting + input 24a connected to ground potential through a compensating resistance 26. A second, inverting — input 24b is connected to rectifier input 22a through an input resistance 28. Input 22a is connected to ground potential through a resistance element 30, and is connected through another resistance element 34 to a first, inverting—input 32a of a third operational amplifier 32. Input 24b is connected to the anode of a first rectifying element 36a, e.g. a diode, having the cathode thereof connected to an output 24c of the second operational amplifier. The anode of a second rectifying element 36b is connected to output 24c, and the cathode thereof is connected to the junction between a first resistance element 38, having its remaining terminal connected to input 24b, and a second resistance element 40, having its remaining terminal connected to third operational amplifier input 32a. Another compensating resistor 42 is connected from ground potential to the remaining, non-inverting + input 32b of third operational amplifier 32. A feedback resistance 44 is connected between third operational amplifier input 32a and an output 32c of third operational amplifier. The precision rectifier means output 22b is formed at the third operational amplifier output 32c, and is connected to the output 12c of the signal conditioning means 12. The signal at output 22b is a negative-polarity full-wave-rectified signal resulting from the addition of the half-wave-rectified signal, at the junction of resistance 38 and diode 36b, and the signal at input 22a.

The signal conditioning means output signal, at output 12c, is a DC signal proportional to $i^2$, i.e the square of the instantaneous magnitude of the current i flowing to the protected component. This signal is compared to a preselected value, equal to $I_N^2$ (where $I_N$ is the r.m.s. value of $i_N$), and the difference is integrated by an integration means 50. The integration means input 50a is connected through an input resistance 52 to a first, inverting—input 54a of a fourth operational amplifier 54. Input 54a is connected through an integrating capacitance element 56 to the fourth operational amplifier output 54b, at which the integrating means output 54b is formed. Output 54b is also connected to the anode of a unidirectionally-conducting element 58, e.g. a semiconductor diode and the like, having the cathode thereof connected to input 54a. A non-inverting + input 54c of fourth operational amplifier 54 is connected through a series resistance 60 to the adjustable tap 62a of a potentiometer 62. The end terminals of potentiometer 62 are connected between ground potential and a source of potential +V, preferably of substantially regulated magnitude. The integration time constant is set by the product of the capacitance of capacitor 56 and the resistance of resistor 52, to a value commensurate with the range of tripping time (e.g. 16 milliseconds at a 15× overload).

Potentiometer 62 is used to set the output voltage of integrator means 50 to a substantially-constant low (e.g. zero) voltage when the input current I is equal to $i_N$, the normal component current magnitude.

Integrating means 50 is a self-resetting integrator by action of diode 58. For all values of component current I less than or equal to the normal current $I_N$ set by potentiometer 62, the voltage at output 50b is low but is sufficient to forward bias diode 58 and place a very low resistance across the integrating capacitor 56. Thus, the integrating capacitance is effectively shorted and integration does not occur; amplifier 54 behaves like a voltage follower and the integrating means output 50b is maintained at the substantially low output voltage of amplifier 32. When the component current r.m.s. magnitude I increases to provide an integrator input voltage increasingly more negative than the voltage set by potentiometer normal 62 for the normal current $I_N$, this increasingly-negative voltage at integrator input 50a causes the voltage at integrating means output 50b to increase in the positive-polarity direction, whereby diode 58 is reverse-biased. The reverse-biased diode 58 provides a high resistance shunting capacitance 56 and integrating means 50 now operates to provide an output voltage which is the time integral of the difference of the voltages at the integrating means input; the integrator means output voltage $$V_i = c \int_o^t (i^2 - I_N^2) dt.$$

If the r.m.s. magnitude of the component current I falls to a value not greater than the normal current $I_N$, integrator means output 50b increases (in the negative-polarity direction) such that diode 58 is again forward biased, discharging integration capacitance 56 and returning the output voltage to the substantially low normal level thereof.

A comparator means 65 is provided by a fifth operational amplifier 66, having a non-inverting + input 66a connected to the integrating means output 50b. The remaining, inverting—input 66b is connected to the adjustable tap 68a of a potentiometer 68, having the ends thereof connected between ground potential and a positive potential +V, also preferably of substantially-constant magnitude. (The voltages ±V are typically those used to provide operating potential to the operational amplifiers themselves.) The output 66c of the fifth operational amplifier is connected to the system trip output 10c. Output 10c is connected to that selected one of the plethora of known means for disabling the protected component; for example, trip output 10c may be connected to the enabling input of a circuit breaker having its contacts connected in series between sensor conductor 10c and the protected load component L. Potentiometer 68 is adjustable to set the $i^2t$ value at which trip output 10c is enabled. If the positive-going voltage at integrating means output 50b attains a suitable positive $i^2t$ value, above the positive bias voltage set at the potentiometer tap 68a, the comparator output 66c switches from a first binary value to a second binary value and generates the trip signal $V_t$ at output 10c. Thus, the trip voltage $$V_{68a} = a \int_o^t (i^2 - I_N^2) dt,$$

where a is a total protection system constant.

The operation of protection system 10, for one set of settings of the normal load current setting potentiometer 62 and the $i^2t$ setting potentiometer 68, is illustrated in FIG. 2 for various overload conditions. The abscissa 70 is logarithmically scaled in amperes of root-mean-square (r.m.s.) current I and the ordinate 72 is logarithmically scaled in seconds of tripping time, i.e. the time required from the initiation of an overload, at a particular overload current, before the trip output 10c voltage $V_t$ is enabled to the trip state. In the illustrated example, the normal current $I_N$ was set, by means of potentiometer 62, for a value of about 40 amperes. The $i^2t$ potentiometer 68 and the integrator time constant (the product of the capacitance capacitor 56 and the resistance of resistor 52) were set such that a point 74a, on the $i^2t$ curve 74, would provide a sufficiently positive integrator means output 50b voltage to provide a trip signal for an r.m.s. current I of 15 times normal current $I_N$, in a single cycle (e.g. about 16.6 milliseconds). The entire curve 74 is moveable leftwardly and rightwardly, as shown by arrows R62, by the adjustment of the normal component current $I_N$ potentiometer 62, while the slope of the curve 74 (typically in the higher overload current region near a maximum normal overload point 74b) is controlled in the direction of the arrows labeled R68 by the setting of the $i^2t$ potentiometer 68. This relatively straight-line section, controlled by potentiometer 68, is that region where I predominates over $I_N$; if I is relatively close to $I_N$ (with the comparator input voltage being proportional to $$\int_o^t (i^2 - I_N^2) dt)$$

a second straight section, as above point 74b, asymptotically approaches the $I_N = I$ line. In this manner, the normal current and overload current time protection characteristics for a particular protected component can each be established by adjustment of one of a pair of easily-set controls of wide-range protection circuit 10.

While a presently preferred embodiment of my novel $i^2t$ protection circuit has been described in detail herein, many modification and variations will now become apparent to those skilled in the art. For example, all of the circuitry from terminals 12a-12b to output terminal 10c may be provided in a single monolithic integrated circuit, which may, or may not, be fabricated upon a portion of the piezoelectric element 10a of the sensor 11. Other forms of square-law current sensors may be utilized, as may other forms of signal conditioning, integrating and comparing means, within the spirit of my present invention. Accordingly, I intend to be limited only by the scope of the appending claims, and not by the particular elements or instrumentalities presented by way of description herein.

What is claimed is:

1. A system for protecting a load component operating by a flow of AC current from damage due to excessive current-time heating, comprising:
   means for directly sensing the square of the instantaneous magnitude (i) of the AC current flowing through said load component to provide a sensing means output signal ($i^2$);
   fixed-gain signal conditioning means for providing an output signal linearly varying as said square of the load component AC current ($i^2$) directly sensed by said sensing means;
   self-resetting means for singly integrating, with respect to time, the signal conditioning means output signal only while the root-mean-square value of the load component current exceeds a preselected normal load component current ($I_N$) and providing an integrated conditioned signal equal to $$c \int_0^t (i^2 - I_N^2)\, dt,$$

where c is a constant; and
   means for providing a trip signal only if the integrated conditioned signal value exceeds a preselected current square-time value, to cause current flow through said load component to terminate.

2. The system of claim 1, wherein said integrated conditioned signal is reset substantially to a predetermined value, less than said preselected current squared-time value, whenever said instantaneous load component current ceases to exceed said preselected normal load component current.

3. The system of claim 2, wherein said self-resetting integrating means comprises: an operational amplifier having an inverting input, a non-inverting input and an output; an input resistance having a first terminal connected to said inverting input and a second terminal receiving said signal conditioning means output signal; another resistance element having a first terminal connected to said non-inverting input and a second terminal; means for providing a substantially constant potential to said another resistance second terminal for establishing the preselected adjustable value ($I_N$) of normal load current; an integrating capacitance element connected between said inverting input and said output; and a single unidirectionally-conducting element connected directly in parallel with said integrating capacitance and poled to conduct if the instantaneous magnitude of the load component current does not exceed the value set by the preselected normal load current potential.

4. The system of claim 3, wherein said trip signal providing means comprises: a comparator having a first input connected to said operational amplifier output, another input and an output at which said trip signal appears; and means connected to said another comparator input for providing a potential thereat establishing the preselected current squared-time value.

5. The system of claim 2, wherein said trip signal providing means comprises: a comparator having a first input connected to said integrating means, another input and an output at which said trip signal appears; and means connected to said another comparator input for providing a potential thereat establishing the preselected current squared-time value.

6. The system of claim 1, wherein said trip signal providing means comprises: a comparator having a first input connected to said integrating means, another input and an output at which said trip signal appears; and means connected to said another comparator input for providing a potential thereat establishing the preselected current squared-time value.

7. The system of claim 1, wherein said signal conditioning means includes rectifier means for providing a DC output signal of magnitude responsive to the square of the instantaneous peak magnitude of the AC load component current.

8. The system of claim 7, wherein said sensor is a piezoelectric sensor, said signal conditioning means further including means for transforming the impedance of said sensor.

9. The system of claim 8, wherein said trip signal is provided within one cycle of the AC current for an overload current about 15 times greater than the preselected normal load current.

10. The system of claim 8, wherein said trip signal is never provided for a load component current of magnitude not exceeding the magnitude of said preselected normal load component current.

* * * * *